United States Patent [19]
Coulbourn

[11] 3,912,926
[45] Oct. 14, 1975

[54] OPTO-ELECTRONIC INCREMENTAL ENCODER

[75] Inventor: Charles Coulbourn, Rolling Hills Estates, Calif.

[73] Assignee: Los Angeles Scientific Instrument Co., Inc., Los Angeles, Calif.

[22] Filed: Oct. 18, 1974

[21] Appl. No.: 515,903

[52] U.S. Cl......... 250/231 SE; 250/237 G; 324/175
[51] Int. Cl.² .......................................... G01D 5/34
[58] Field of Search ... 33/1 PT; 250/231 SE, 231 R, 250/237 R, 237 G; 324/175; 340/347 P; 356/139, 169

[56] References Cited
UNITED STATES PATENTS

| | | | |
|---|---|---|---|
| 2,945,167 | 7/1960 | Gunther | 250/231 SE |
| 3,400,275 | 9/1968 | Trump | 250/231 SE |
| 3,544,800 | 12/1970 | Elliott | 250/237 G |

Primary Examiner—James W. Lawrence
Assistant Examiner—D. C. Nelms
Attorney, Agent, or Firm—Joseph F. Cuneo

[57] ABSTRACT

An opto-electronic incremental encoder for determining the amount and direction of shaft rotation, such as used in a planimeter, consisting of two discs each having two concentric annular arrangements of alternating transparent windows and opaque sections, two photodetectors, and light producing means. Both discs are of identical design with the exception of the central holes. Since one disc is fixed to the encoder body while the second is fixed to a shaft that rotates, the windows and opaque sections of each annular corresponding arrangement alternately transmit and block the light as the shaft rotates. The windows of the inner annular rings of each disc are offset one quarter of the angular width of the corresponding windows of the outer annular rings so that a quasi-sine wave from the first photodetector leads the quasi-sine wave generated by the second photodetector by about 90° when the shaft is turned in one direction and lags 90° when the shaft is rotated in the opposite direction. Electronic circuits process the signals to provide an increasing or decreasing count depending how the shaft is rotated.

4 Claims, 8 Drawing Figures

OPTO-ELECTRONIC INCREMENTAL ENCODER

The present invention relates to an opto-electronic incremental encoder for measuring the angle of rotation as well as the direction of rotation of a shaft. Such a device is particularly suited for use in connection with measuring instruments such as planimeters and the like.

A planimeter generally employs a single wheel rotatably mounted in a mechanism so that when a pointer, which is a part of the mechanism traces the perimeter of a closed area, the net rotation of the wheel combined with the fixed dimensions of the device, gives an accurate measurement of the area. The net rotation of the wheel, usually less than 1 inch in diameter, has been obtained by reading from a vernier formed by an extension of the wheel and a fixed sleeve. Verniers of this type are difficult to read, the measuring operation is tedious and slow, and as a result errors are quite frequent; also accidental movement of the wheel can occur while readings are being made thereby introducing an additional source of error.

In the present invention the wheel of the planimeter is secured to a shaft of a direction sensing encoder. The output of the encoder is fed to an electronic circuit which transforms the signal to a form suitable for a digital readout. Prior to the commencement of a measurement, the zero setting switch that is provided for the digital readout, is returned to zero and as the area is being measured the counter maintains a running total of the net shaft rotation so that at the completion of the operation the readout immediately displays the correct result in large, easily legible numerals, thereby substantially decreasing the possibility of making erroneous readings.

Heretofore other types of encoders have been available for providing output signals for up-down counting, however, each of them has had some undesirable features. One popular type utilizes two discs each provided with a singular annular ring arrangement comprising alternating transparent windows and opaque slots. The annular ring of one disc contains one more or one less slot than the annular ring of the other disc. Thus when the disc is rotated relative to the other disc, a moire pattern is formed and is used to modulate a light beam. Two detectors spaced 90° apart generate two output signals which are 90° out of phase. This type of encoder has two objectionable drawbacks: (1) the two discs used are of different design; and (2) the discs must be centered very precisely or the device cannot function properly. Such an encoder is expensive to produce.

A second type employs two identical discs each having a single annular ring equally divided into alternating transparent windows and opaque sections. One disc is mounted eccentrically so that as it is turned relative to the other disc, a moire pattern is produced which can be used to modulate a light beam. The two detectors are spaced 90° apart and generate two signals that are 90° out of phase. The objectionable feature of this system is that the discs must be very precisely located, and this is very time consuming and costly.

Other types of encoder systems have been proposed but each has one or more of the following objectionable drawbacks: (1) the tolerance requirements are too stringent; (2) different disc designs are employed; (3) so many parts are necessary that they are impractical for use as small encoders of the type required.

My invention either eliminates entirely or offers a substantial reduction in the objectional features found in existing encoder systems. Two discs are utilized that are identical in every respect with the exception of the center holes that are of different diameters. This feature minimizes disc cost and eliminates production stocking problems. The two discs, light source and the photodetectors are mounted in such a way that alignment of the discs is much less sensitive than it is in existing encoder systems. This feature again permits lowering production costs and reduces manufacture rejection rates. The design is also much simpler than has been heretofore proposed.

Additional features and advantages of this invention will be more readily understood after reading the following detailed description and studying the accompanying illustrations in which.

Figure 1:
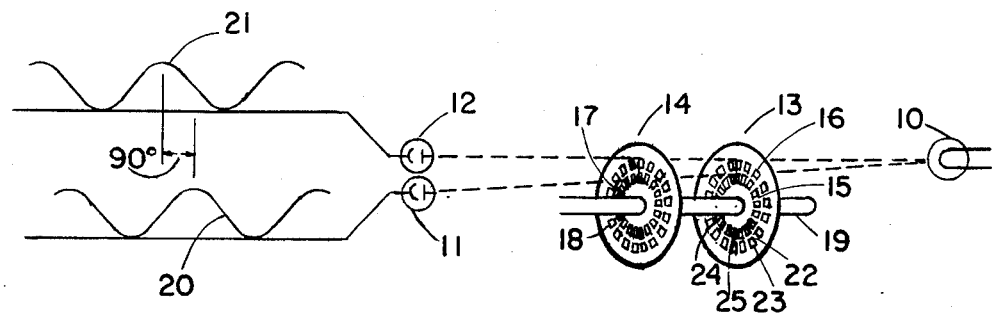
FIG. 1 shows an encoder system having two identical discs, a single light source, with two photodetectors showing their output wave forms and the phase relationship between the two waves which is established by the direction of rotation.

The essential elements of the new opto-electronic incremental encoder according to my invention are illustrated in FIG. 1. A single lamp 10 illuminates photodetector 11 when the transparent windows of inner rings 15 and 17 of rotating disc 13 and fixed disc 14 respectively, are properly aligned. Lamp 10 also illuminates photodetector 12 whenever the outer transparent windows on outer rings 16 and 18 of rotating disc 13 and fixed disc 14 respectively, are in proper alignment. Stationary disc 14 is secured to the encoder body, not shown, while rotating disc 13 is secured to shaft 19 and rotates with it. The spacing between discs 13 and 14 is shown exaggerated to make the illustration easier to understand, but in practice it can be made as small as practical to provide for adequate clearance as is shown in FIG. 3. The number of transparent windows in the outer circles 16 and 18 and the inner circles 15 and 17 of discs 13 and 14, are equal and the angular width of all windows is also equal. The angular width of all opaque sections separating the windows in each circle of the two discs is also approximately equal to the angular width of the windows, as shown in FIG. 2.

As the shaft 19 and the rotating disc 13 turn, photodetectors 11 and 12 generate quasi-sine waves 20 and 21 respectively. Because the angular position of the windows in outer annular rings 16 and 18 are advanced a sufficient amount with relationship to the angular position of the windows in the inner annular rings 15 and 17, the position of quasi-sine waves 20 and 21 are separated in phase relationship by nominally 90°. Turning shaft 19 and disc 13 in one direction, the phase of wave 21 will lead that of wave 20. Turning the shaft and disc in the opposite direction will cause wave 21 to lag wave 20 in phase. Electronic circuits can easily be made to interpret the direction of shaft rotation due to the relative phase relationship of quasi-sine waves 21 and 20.

Figure 2:
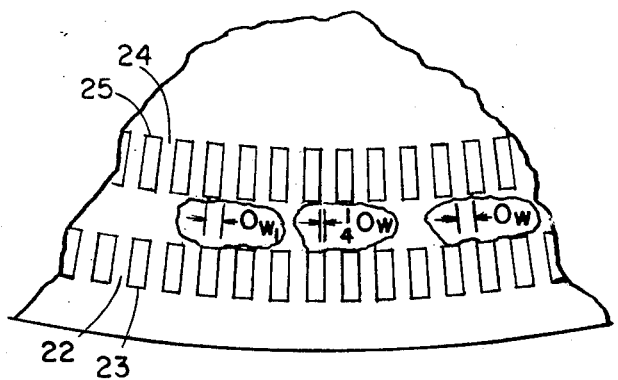
FIG. 2 shows an enlarged plan view of a portion of one of the two identical discs.
Figure 3:
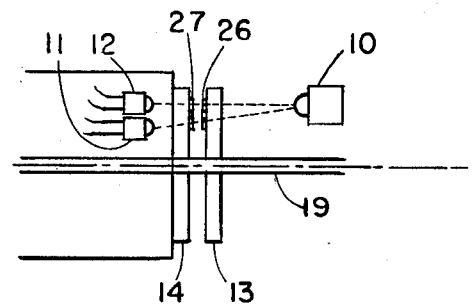
FIG. 3 is a side view of the two discs showing the location of the light source and the locations of the two photodetectors.

FIG. 2 shows an enlarged section of rotating disc 13 which is identical in design to stationary disc 14. The angular width Ow of each opaque section 22 of outer ring 16 is nominally equal to angular width $Ow_1$ of each transparent window 23, of that ring, and the angular width of opaque sections 24 of inner ring 15 is nominally equal to the angular width of each transparent window 25, of that ring. FIG. 2 shows that transparent windows 25 of inner annular ring 15 are offset from windows 23 on outer annular ring 16 by one-fourth the angular width of the windows. Each time the rotating disc turns an amount equal to 2 Ow, the phase of each output wave advances by 360°, thus Ow/4 separation of the windows in the inner and outer annular rings causes a 45° phase separation between output waves 21 and 20. Since two identical discs are used back to back, each disc effectively contributes 45° to the phase difference so that a net difference of 90° results.

Both discs 13 and 14 can be produced from the same artwork, which can be drawn to a large enough scale so that the necessary tolerances can be achieved. This artwork is then reduced to the desired size, usually three-quarters of an inch in diameter, and the reduced artwork can be photographically reproduced to provide the design for a large number of discs. If two separate designs were required for each pair of discs, the cost would be much higher.

The actual arrangement of discs 13 and 14, lamp 10, photodetectors 11 and 12, and the paths of light transmitted through the inner and outer annular arrangement of windows of the two discs is shown in FIG. 3. The position of photographic emulsions 26 and 27 that are affixed to the respective disc surface are also shown, these are mounted on the discs so that they are adjacent to each other.

Figure 4:
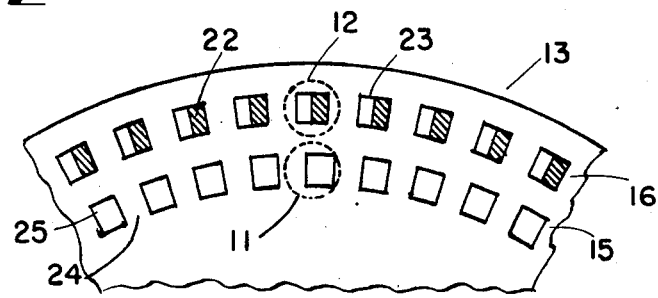
FIG. 4 shows the two discs as viewed from the light source, for one angular position of the revolving disc.
Figure 5:
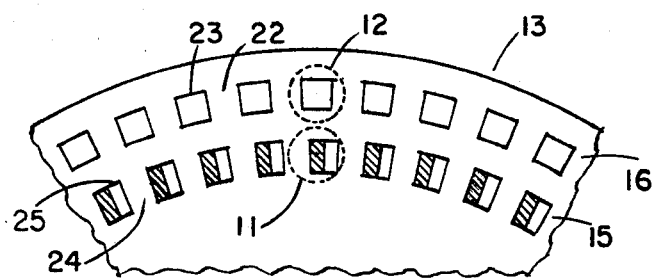
FIG. 5 shows the two discs as viewed from the light source, when the revolving disc is in another angular position from the one shown in FIG. 4.

FIGS. 4 and 5 are partial views of disc 13 in two positions relative to disc 14 when viewed from the location of lamp 10. FIG. 4 shows rotating disc 13 in an angular position where opaque sections 22 of the outer annular ring of disc 14 obscure a part, approximately one-half, of the outer annular ring windows 23 of disc 13. The relative locations of photodetectors 11 and 12 are designated by the broken circles in both FIGS. 4 and 5. Since only about one-half of the light can pass through windows 23 of the outer annular rings to impinge on photodetector 12 in FIG. 4, the output from detector 12 will be approximately midway between maximum and minimum. The inner annular rings of discs 13 and 14 show windows 25 in full registry in FIG. 4, therefore maximum light will pass through the windows to impinge photodetector 11, and the output of that detector will be at a maximum.

In FIG. 5 the position of disc 13 is such that windows 23, located in the outer annular rings of discs 13 and 14, are in full registry, therefore maximum light will pass through windows 23 to impinge photodetector 12 and the output of that detector will be at its maximum. Due to the position of opaque sections 24 of inner annular ring 17 of disc 14, approximately half of the light can impinge photodetector 11, therefore its output will be approximately midway between maximum and minimum.

Figure 6A:
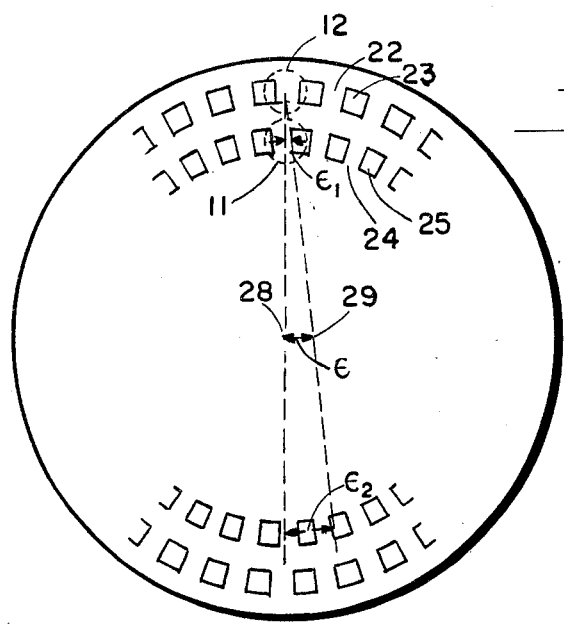
FIGS. 6a and 6b illustrate how sensitivity to eccentricity is minimized by employing the device according to this invention.
Figure 6B:
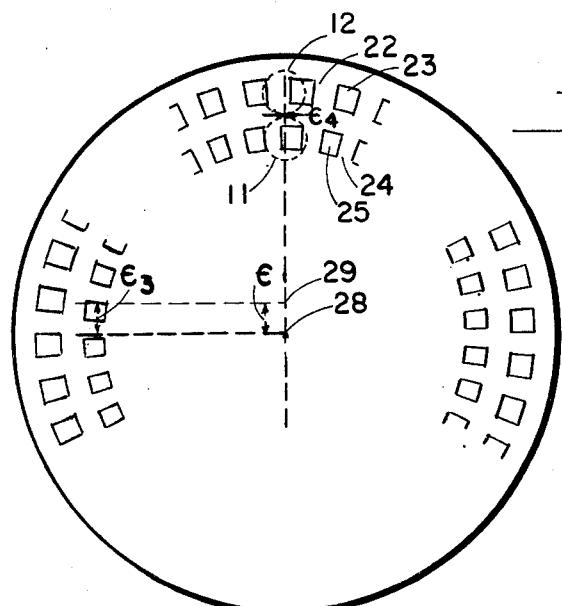

Most encoder devices that have been produced up to the present have required that extremely tight tolerances be met in positioning the axis of the central hole of each disc to conform with the exact geometrical center of the disc. This requirement is difficult to meet, is usually quite time consuming and makes the cost of the finished product extremely high. FIGS. 6a and 6b graphically demonstrate how encoders according to the present invention overcome this stringent requirement and are relatively insensitive to eccentricity errors resulting from incorrectly locating the axis of the central hole of a disc.

Detectors 11 and 12 are positioned immediately adjacent to one another with their longitudinal axes both passing through a radius that is perpendicular to the longitudinal axis of the revolving disc. The positions of photodetectors 11 and 12 are indicated in FIGS. 6a and 6b by the ghosted-in circles. Center 28 is the true center of the disc in both FIGS. 6a and 6b. In FIG. 6a let it be assumed that center 29 has been incorrectly drilled so that it is removed from true center 28 by an amount $\epsilon$ and is to the right of 28 but is on the same horizontal diameter passing through 28. In FIG. 6b let it be assumed that center 29 has been incorrectly drilled so that it is removed from true center 28 by an amount $\epsilon$ and is above 28 but is on the same vertical diameter passing through 28. Since the most harmful effect due to eccentricities is the resulting error in the phase relationship between the two output waves, the severity of the error is denoted by $\epsilon_1$ in FIG. 6a, and by $\epsilon_4$ in FIG. 6b. This error $\epsilon_1$ or $\epsilon_4$ is the maximum amount that a window 25 of the inner annular rings is removed from its correct position when a window 23 of the outer annular rings is correctly positioned. Where the photodetectors 11 and 12 are positioned adjacent to each other according to the present invention, the worst error $\epsilon_1$ is reduced from the eccentricity error $\epsilon$, by a factor which is the ratio of the radius of the outer annular ring to the distance between the outer and inner annular rings. This reduction is typically by a factor of from four to five for the same eccentricity error $\epsilon$, but the relative wheel positions of FIG. 6b, the error $\epsilon_4$ reduces to zero.

Consider the situation where detector 11 is located at an angular position 180° from detector 12 (diametrically opposite center 28) as is the case in some existing encoders, the maximum error $\epsilon_2$ would be nearly double the eccentricity error $\epsilon$.

If inner detector 11 were located at an angular position 90° removed from outer detector 12, as is the case in some existing encoder constructions, as illustrated in FIG. 6b, error $\epsilon_3$ would be exactly equal to the eccentricity error $\epsilon$. It is readily apparent that by arranging the photodetectors in the manner described in this invention, the sensitivity due to eccentricity errors becomes greatly reduced, thus requiring less stringent eccentricity tolerances.

Figure 7:
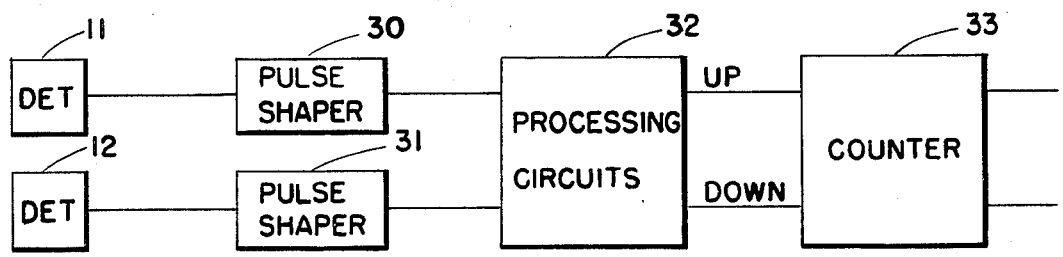
FIG. 7 is a block diagram showing the relationship of the electronic processing circuits.

FIG. 7 shows how the output from the direction sensing encoder can be processed. The quasi-sine wave output from photodetectors 11 and 12 is first squared in pulse shapers 30 and 31 and is then fed to processing circuits 32. Here pulses are generated at both the leading and the lagging edges of the squared waves. If the shaft is rotated in one direction, these pulses are transmitted out of one port; if rotation is reversed the pulses are transmitted from the opposite port. These are then fed to a conventional up-down counter 33. This electronic circuit is not a part of this invention and has only been included to make the invention more easily understood.

While one embodiment of the novel opto-electronic incremental encoder for measuring the angle of rotation as well as determining the direction of rotation of the shaft, has been described in detail herein, it is intended that various changes and further arrangements, as well as modifications may be made without departing from the scope of the invention.

I claim:

1. An opto-electronic incremental encoder comprising: a first disc stationarily mounted in an encoder body and a second disc, identical in design to said first disc, rotatably mounted on a shaft, the longitudinal axis of each disc coinciding with the longitudinal axis of said shaft, said first and second discs being positioned adjacent to each other; the first and second discs being provided with an identical outer annular arrangement of alternating transparent windows and opaque sections; the first and second discs being also provided with an identical inner annular arrangement of alternating transparent windows and opaque sections, the angular width of all transparent windows and opaque sections being substantially equal; light producing means mounted on one side of said first and second discs positioned to impinge beams of light on both said outer and inner annular arrangements of windows and opaque sections of said discs; a first photodetector means mounted in the encoder body on the opposite side of said first and second discs from said light producing means and positioned to receive light passing through the transparent windows of said outer annular arrangements of windows of said first and second discs; and a second photodetector means mounted in the encoder body on the opposite side of said first and second discs from said light producing means and positioned to receive the light passing through the transparent windows of said inner annular arrangements of windows of said first and second discs, the longitudinal axes of said first and second photodetector means intersecting a radius that is perpendicular to the longitudinal axis of said shaft.

2. An opto-electronic incremental encoder according to claim 1 wherein the light producing means is a single light producing means.

3. An opto-electronic incremental encoder according to claim 1 wherein the longitudinal axes of said first and second photodetectors intersect said radius so as to position said first and second photodetectors adjacent to each other.

4. An opto-electronic incremental encoder according to claim 1 wherein the windows of the inner annular arrangement of said first and second disc are offset a distance in either direction, equivalent to one fourth of the angular width of the corresponding window in the outer annular arrangement of transparent windows and alternating opaque sections of the respective disc.

* * * * *